Figure 8:
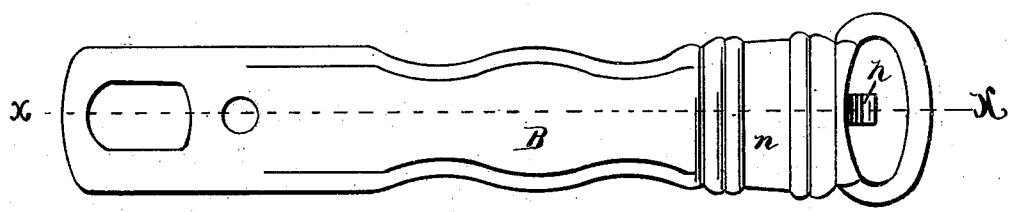

(Model.) 2 Sheets—Sheet 1.
E. R. CAHOONE.
HARNESS SADDLE.
No. 247,744. Patented Oct. 4, 1881.
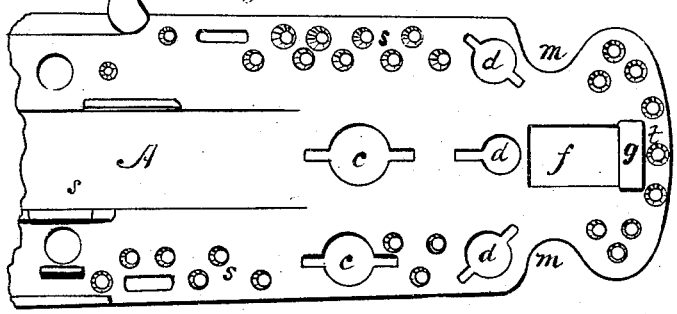
Fig. 1.
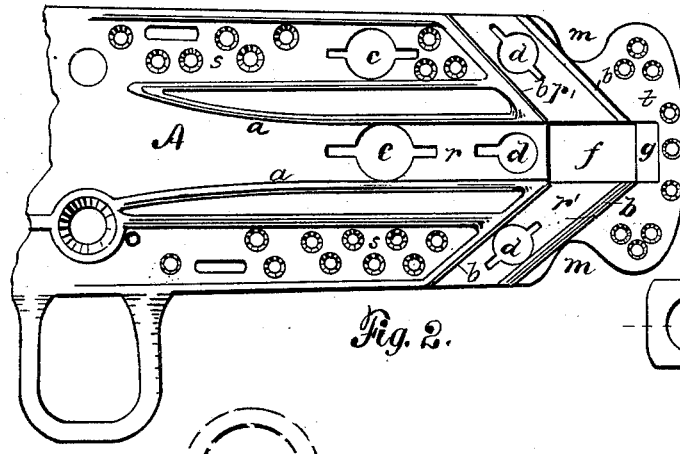
Fig. 2.
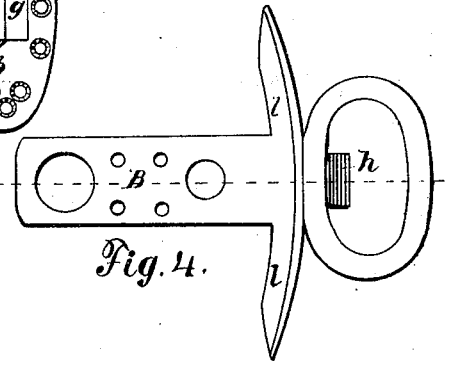
Fig. 3.
Fig. 4.
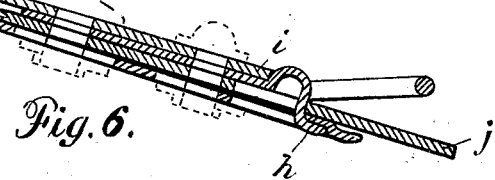
Fig. 6.
Fig. 5.
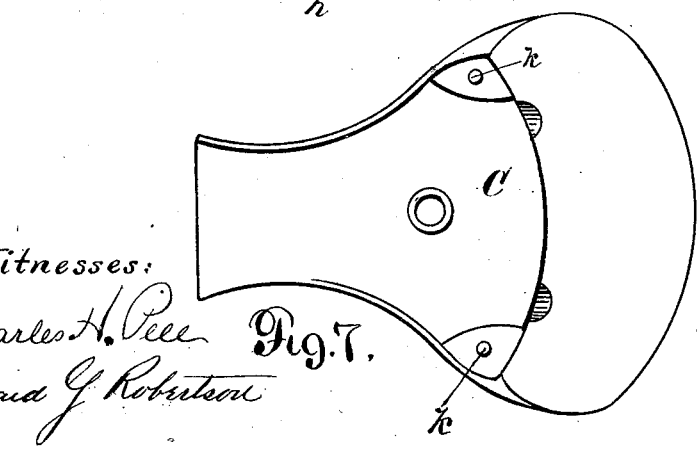
Fig. 7.
Witnesses:
Charles H. Pell
Edward J. Robertson
Inventor:
Edwin R. Cahoone (Model.)

E. R. CAHOONE.
HARNESS SADDLE.

No. 247,744. Patented Oct. 4, 1881.

2 Sheets—Sheet 2.

Witnesses
Charles H. Pell
Edward J. Robertson

Inventor:
Edwin R. Cahoone

UNITED STATES PATENT OFFICE.

EDWIN R. CAHOONE, OF NEWARK, NEW JERSEY.

HARNESS-SADDLE.

SPECIFICATION forming part of Letters Patent No. 247,744, dated October 4, 1881.

Application filed April 11, 1881. (Model.)

*To all whom it may concern:*

Be it known that I, EDWIN R. CAHOONE, of Newark, in the county of Essex and State of New Jersey, have invented certain new and useful Improvements in Harness-Saddles, of which the following is a specification.

My invention relates to a combination of new devices forming a harness-saddle tree, which devices and the manner of their combination are hereinafter fully described.

One of the main objects of my invention is to have the metal back-band loops secured to the frame by means of a hook or lock-piece cast therewith, and which is adapted to enter a slot or receptacle formed for it at the lower ends of the frame. Said loops, when desirable, have side arms, as in Fig. 4, against which the ends of the jockeys are fitted. In other instances, especially in smaller saddles, they are made long, as in Fig. 8, without the side arms, but representing a leather loop.

The frames of my tree have holes at their outer ends for the insertion of the nuts for the terrets and pad-screws, said holes serving also the purpose of allowing the hooks or lock-pieces of the back-band loops to enter, passing downward into a receptacle or against a bar prepared for them at the ends of said holes for said hook or lock-pieces, pressing, when in place, against the upper part of the elevated cross-bars. Said openings $ff$ are near the lower edges of the jockeys. Part of the hole may be covered by the jockeys, and the other part by the loops or back-bands when in their place.

Ribs are placed obliquely of the frame, running parallel upward from said openings, forming a passage-way for the insertion of the nuts for the pad-screws, as before referred to, other ribs running upward parallel, for passing in place the nuts for the terrets and nuts for single pad-screws when such screws are used; also, ribs on the under side of the frame extending up to the center of the arch of the tree for the purpose of strengthening the same.

Another feature is the seat with a solid metal back, constructed to answer a double purpose—viz., for japanning when japanning is preferred, and to cover with leather when leather is preferred, which is readily covered by riveting or nailing in the place designed for them on the under side pieces of leather or other suitable material for tacking the ends of the binding-leather, which heretofore had to be tacked to a wood back, a wood back being provided for that purpose, which made it impracticable to japan; hence two different seats had to be used.

Heretofore the metal back-band loops depended for security in their places on the terrets or terrets and pad-screws.

In my invention the end hooks or lock-pieces in combination with the terrets or terrets and pad-screws, make a much more secure job, besides preventing a side motion without having to use pad-screws or their equivalents to hold them down.

Nuts for terrets and pad-screws have been passed downward from an orifice at the terret-holes; but in that case an extra piece had to be used at the terret-hole to close up so large an opening, so as to fasten the terrets.

My invention has the openings at the end of the tree, or nearly so, which is much more simple, and said opening also answers for another purpose—viz., the securing of the hooks or lock-pieces. A similar device has been used in an under piece, but that is perfectly impracticable for the purpose for which my invention is designed.

Seats for saddle-trees have been made with solid backs of metal cast solid to be japanned or plated; but my seat is provided with holes $k\ k$ for riveting or nailing on a piece of leather, as seen in Fig. 7, to tack the binding-leather to when such seat is used for covering.

Figure 9:
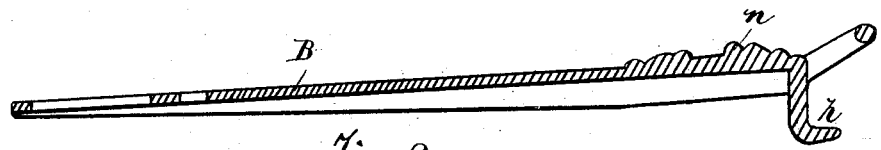
Figure 10:
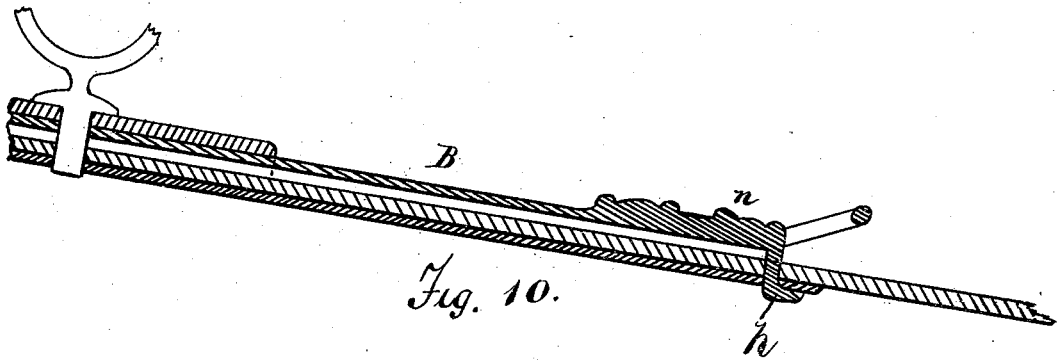

In the drawings, Figure 1 is a top view of one-half of a frame of my tree, showing holes $s$ on the margin on each side for tacking on the flaps before the jockeys are secured in place, holes $t$ at the outer ends for nailing or riveting on stiffeners, holes for terret-shanks, holes for pad-screws, holes for inserting the nuts to be passed to their places, also the top part of the receptacle for the hook or lock-piece for the metal back-band. Fig. 2 is a view of the under side of one-half of my frame, showing the ribs for the guidance of the nuts for the terrets and pad-screws, besides the under parts of the holes, as mentioned in Fig. 1. Fig. 3 is a view of my back-bank loop without arms, showing the end hook or lock-piece at the loop ends, also nail-holes for tacking them temporarily in their place when required to fit the jockeys, also the holes for the terret-shank and shanks for the pad-screws. Fig. 4 is a view of my back-band loops, showing the arms, as seen in contradistinction to loop, Fig. 3. Fig. 5 is a view of my back-band loop cut in two lengthwise through the center. Fig. 6 is a view of my tree when made up with flaps, jockeys, and back-band loops, pad-screws, and terrets cut lengthwise through the center. Fig. 7 is view of the under side of my seat, showing pieces of leather nailed or riveted thereto, to which the ends of the leather bindings are tacked. Fig. 8 is a view of my back-band loop when made long for light harness. Fig. 9 is a longitudinal section of the loop shown in Fig. 8. Fig. 10 is a longitudinal section of the loop shown in Fig. 8, showing the different parts put together—viz., terret-jockey, loop with lock-piece, flap, and under piece.

In these figures, $a\ a$ are the ribs on the under side of the tree-plate, which run parallel with the edges of the frame and serve to strengthen the frame and guide the terret-nut to place. $b\ b$ are ribs which run obliquely upward for guiding the pad-screw nuts, forming a raceway, $r$, between them for the said nuts. $c\ c$ are the terret-holes. $d\ d$ are the pad-screw holes. $f$ are holes for the insertion of the nuts as set forth. $g\ g$ are the receptacles for the hook or lock-piece of the back-bands. $h\ h$ are the lock-pieces. $i\ i$ are the leather jockey. $j\ j$ are the flaps. $k\ k$ are the holes for riveting on the leather pieces to which are tacked the binding-pieces when the seats are leather-covered. $l\ l$ are arms on the back-band loops. $m\ m$ are the inlets. $n\ n$ are the long loops. A is the tree-plate. B is the back-band loops. C is the seat.

The tree-plate is smooth at its upper surface with a groove, $s$, at the center for the back-bands of leather, when used, said groove beginning at or about the terret-holes and gradually deepening to the center sufficiently for said back-bands.

It is not new to make a saddle-tree with a back-band groove extending its entire length and of uniform depth throughout. Such a groove has heretofore been formed by increasing the thickness of the edges of the tree, while I have my tree of substantially-uniform thickness throughout and form the back-band groove by simply sinking the face of the tree in casting, making a depression whose greatest depth is beneath the seat and tapers thence to nothing or runs out at the terret-holes. By this construction I preserve the flat smooth face of the tree, and thus enable the application of the leather and trimmings in an easy manner and in perfect symmetry.

At or about the pad-screw holes the plates have curves or inlets $m\ m$, for the purpose of allowing the jockeys to be sewed close to the back-bands or back-band loops, forming at the ends of the frame a kind of ogee curve.

The loops or dies to the back-band holders, while quite convenient, are not absolutely necessary, since the hook will answer every purpose.

I claim as my invention—

1. The plate A, having a smooth flat upper surface, provided with the depression or groove $s$, deepest at the point of application of the seat, and tapering or running out thence toward the terret-holes, to receive the back-band leather, substantially as shown and described.

2. A back-band holder provided with a downwardly and outwardly curved hook arranged to project within the holder, as shown, and adapted to engage with an orifice in the saddle or pad to hold the loop in place and resist longitudinal, lateral, and vertical displacement, substantially as described.

3. A tree plate or frame having the holes $f$ at or near its lower ends, and the raceways $r$ and $r'$, leading to the pad-screw and terret-holes, whereby the pad-screw nuts and terret-nuts may be readily inserted or withdrawn after the saddle is made up for changing trimmings.

4. A tree plate or frame provided with a hole at or near its lower end for the insertion or withdrawal of the terret and pad-screw burrs, combined with a back-band loop having a hook or lock-piece to engage in said hole, and to cover the same when the loop is in place, as shown and described.

5. The metal seat C, provided with holes $k$, a solid back of metal, and pieces of leather arranged in connection with said holes to adapt the seat for the reception and securing of a leather covering.

EDWIN R. CAHOONE.

Witnesses:
ABRAHAM MANNERS,
EDWARD G. ROBERTSON.